(12) United States Patent
Hainbach

(10) Patent No.: US 8,192,823 B2
(45) Date of Patent: Jun. 5, 2012

(54) FLOORING TILE WITH MESH LAYER

(75) Inventor: Dirk Hainbach, Lancaster, PA (US)

(73) Assignee: Regupol America LLC, Lebanon, PA (US)

( * ) Notice: Subject to any disclaimer, the term of this patent is extended or adjusted under 35 U.S.C. 154(b) by 331 days.

(21) Appl. No.: 12/642,988

(22) Filed: Dec. 21, 2009

(65) Prior Publication Data

US 2011/0151174 A1    Jun. 23, 2011

(51) Int. Cl.
*B32B 7/02* (2006.01)
(52) U.S. Cl. ............ 428/78; 428/192; 428/218; 442/1; 442/45; 442/58
(58) Field of Classification Search ............ 428/78, 428/192, 218; 442/1, 45, 58
See application file for complete search history.

(56) References Cited

U.S. PATENT DOCUMENTS

| | | | |
|---|---|---|---|
| 2,940,887 A | 6/1960 | Daly et al. | |
| 3,446,122 A | 5/1969 | Raichle et al. | |
| 3,801,421 A | 4/1974 | Allen et al. | |
| 3,978,263 A | 8/1976 | Wellensiek | |
| 4,082,888 A | 4/1978 | Portin | |
| 4,112,176 A | 9/1978 | Bailey | |
| 4,243,696 A | 1/1981 | Toth | |
| 4,600,639 A | 7/1986 | Berlemont | |
| 4,710,415 A * | 12/1987 | Slosberg et al. | 428/48 |
| 4,810,560 A | 3/1989 | Sell | |
| 5,221,702 A | 6/1993 | Richards | |
| 5,367,007 A | 11/1994 | Richards | |
| 5,470,173 A | 11/1995 | Schmidt | |
| 5,587,234 A | 12/1996 | Kiser | |
| 5,645,914 A | 7/1997 | Horowitz | |
| 5,714,219 A | 2/1998 | Mashunkashey et al. | |
| 5,714,263 A | 2/1998 | Jakubisin et al. | |
| 6,623,840 B2 | 9/2003 | Hainbach | |

* cited by examiner

*Primary Examiner* — Alexander Thomas
(74) *Attorney, Agent, or Firm* — McNees Wallace & Nurick LLC

(57) ABSTRACT

A protective floor tile having a first layer, a second layer and a mesh layer. The first layer has a first density and a first dimensional movement with respect to changing environmental conditions. The second layer has a second density, which is less than the first density, and a second dimensional movement with respect to the changing environmental conditions. The mesh layer is positioned between and adhered to the first layer and the second layers. The mesh layer has dimensional stability with respect to the changing environmental conditions. The mesh layer allows the first dimensional movement of the first layer to be isolated from the second dimensional movement of the second layer.

12 Claims, 2 Drawing Sheets

FLOORING TILE WITH MESH LAYER

FIELD OF THE INVENTION

This invention relates generally to a flooring tile with a mesh layer. In particular, the invention is directed to durable, dimensionally stable, cushioned flooring tile for use in playgrounds, patios, fitness rooms, restaurants, factories and the like.

BACKGROUND OF THE INVENTION

Many participant-sport activities are played on a hard, non-cushioned playing surface. For instance, many running tracks are asphalt, tennis courts are typically cement or composition material, and many playgrounds are cement or asphalt. These materials, e.g., asphalt, cement, wood, etc., have the distinct advantages of durability, ease of maintenance, and tolerance of temperature extremes. However, unlike a softer, cushioned, surface as grass or mats, the hard, non-cushioned surfaces are a frequent cause of injuries, especially to children in the playground environment.

Many of the composition surfaces, such as rubberized asphalt, which are somewhat elastic and more cushioned than asphalt or cement, and hence more desirable in such circumstances, are unfortunately both expensive and difficult to apply and to maintain. For these reasons, sports surfaces which are subject to a considerable amount of hard use have typically been extremely hard and non-cushioned. Such surfaces are typically easier to maintain and are capable of withstanding heavy use. In particular sports or play environments, such as school playgrounds, the likelihood of injurious contact between the user and the playing surface is relatively high, and hence such environments have typically not been made available for use unless a softer cushioned surface, such as grass, sand or sawdust, is available. In other sports, however, such as tennis, track, the risk of injury due to a hard playing surface is not as great, although still present. In many of these applications, however, where the risk of injury is not undesirably high, a cushioned playing surface may be desirable for other reasons, namely to aid in the playing of the game, but is still not used, because the cushioned surface is not sufficiently durable or adaptable to outdoor environments or is too expensive. Thus, the lack of a durable, inexpensive cushioned surface suitable for use in sports or playgrounds has had a detrimental effect on both the level and quality of those activities.

There are additional uses of cushioned protective surfaces other than for sports or playgrounds. In areas of high traffic, hard floors can cause various ailments such as bad knees and the like. On factory floors and other areas in which people must stand, hard floors can cause back and other problems. In physical therapy facilities, the use of hard floors is also minimized to prevent injury. Protective surfaces are particularly needed in those environments which are susceptible to extreme temperature change or other environmental hazards.

Rubber flooring is one alternative used to minimize impact. The rubber flooring can be used in all of the environments described above. These floors generally consist of a top layer or wear surface and a backing layer that provides the cushioning and shock absorption characteristics required for the particular application.

One such protective flooring is described in U.S. Pat. No. 6,623,840. The protective flooring tile disclosed has a durable and water resistant prefabricated top layer which is made of rubber material. The top layer has a top surface and a bottom surface, with the bottom surface having voids which extend from bottom surface toward the top surface. A resilient bottom layer extends from the top surface and is made of granulated rubber. The bottom layer has a prepolymer material provided between the granulated rubber which bonds the granulated rubber together. The prepolymer material flows from the bottom layer into the voids of the top layer during the manufacture of the protective flooring tile to bond the top layer to the bottom layer. The density of the top layer of the protective flooring tile is greater than the density of the bottom layer, which allows the top layer to provide the water resistant characteristics required for harsh environments. The prefabricated top layer may also have controlled geometric patterns provided therein.

While rubber floorings can be effective for providing cushioning and protecting against injury from impact, current products offered in the market have various limitations. The rubber floors which are made from one material generally have porous surfaces which allow the penetration of the liquid into the tile, resulting in damage to the tile. Flooring made from different materials have different densities associated with the materials, which can cause problems with dimensional instability and with curling and lifting of the corners. Therefore, it would be beneficial to provide a cushioned flooring which could be used in sports facilities, restaurants, factories, and playgrounds which has the dimensional stability to be used in all environments both indoors and outdoors.

SUMMARY OF THE INVENTION

One aspect of the invention is directed to a protective floor tile having a first layer, a second layer and a mesh layer. The first layer is made from material which has a first density. The first layer has first dimensional movement with respect to changing environmental conditions. The second layer is made from material which has a second density, the second density being less than the first density. The second layer has second dimensional movement with respect to the changing environmental conditions. The mesh layer is positioned between the first layer and the second layer. A first surface of the mesh layer is adhered to the first layer and a second surface of the mesh layer is adhered to the second layer. The mesh layer has dimensional stability with respect to the changing environmental conditions. The mesh layer allows the first dimensional movement of the first layer to be isolated from the second dimensional movement of the second layer.

Another aspect of the protective floor tile has a durable and water resistant top layer made from material having a first density. The top layer has first dimensional movement capabilities with respect to changing environmental conditions. A resilient bottom layer is provided and made from material having a second density, the second density being less than the first density. The bottom layer having second dimensional movement capabilities with respect to the changing environmental conditions. A mesh layer is positioned between the top layer and the bottom layer, with a first surface of the mesh layer being adhered to the top layer and a second surface of the mesh layer being adhered to the bottom layer. The mesh layer has dimensional stability with respect to the changing environmental conditions. The mesh layer allows the first dimensional movement of the top layer to be substantially isolated from the second dimensional movement of the bottom layer.

Another aspect of the protective floor tile has a durable and water resistant first layer made from material having a first density. The first layer has first dimensional movement capabilities with respect to temperature and moisture variations. A resilient second layer is provided and is made from material having a second density, with the second density being less than the first density. The second layer has second dimensional movement with respect to the temperature and moisture variations, the second dimensional movement being different than the first dimensional movement. A fiber mesh layer is positioned between the first layer and the second layer, with a first surface of the fiber mesh layer being adhered to the first layer and a second surface of the fiber mesh layer being adhered to the second layer. The fiber mesh layer has dimensional stability with respect to the temperature and moisture variations. The fiber mesh layer allows the first dimensional movement of the first layer to be substantially independent of the second dimensional movement of the second layer resulting in minimal internal stress in the protective flooring tile.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
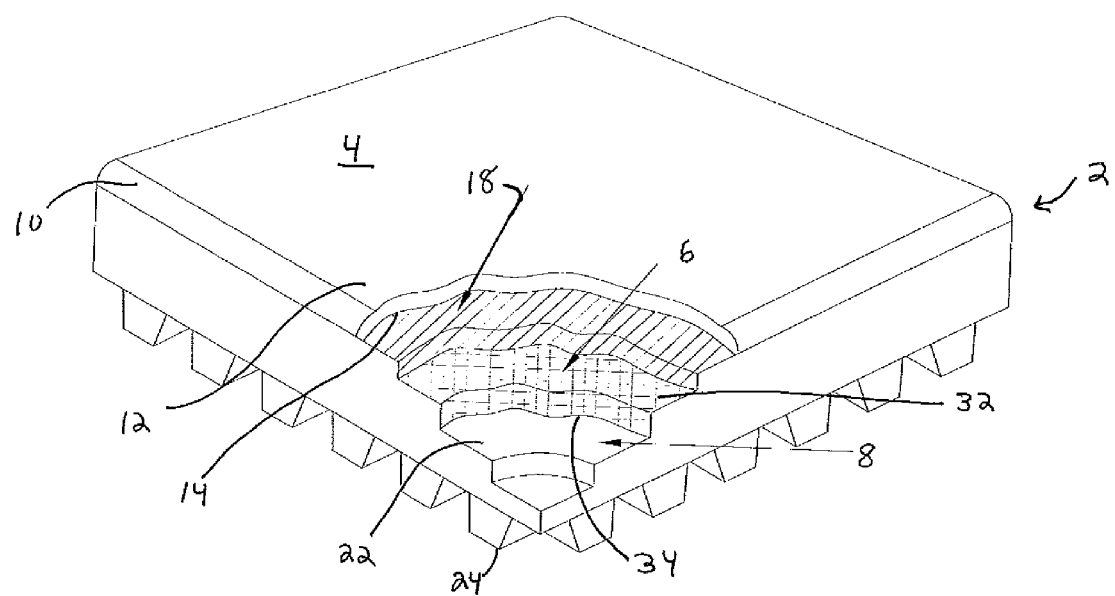
FIG. 1 is a perspective view of a flooring tile according to the present invention with a portion cut away to better shown the layers.
Figure 2:
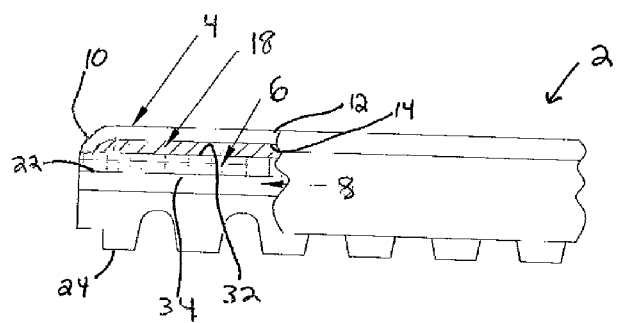
FIG. 2 is a side view of the flooring tile of FIG. 1 with a portion shown in cross-section.

In the embodiment shown in FIGS. 1-2, a cushioned protective tile 2 has a top layer 4, a bottom layer 8 and a fiber mesh 6 provided between the top layer 4 and the bottom layer 8. A plurality of tiles 2 are installed adjacent to each other to form a cushioned protective surface.

The top layer 4, as shown in the embodiment has a generally square configuration with edges 10 provided on all four sides of the top layer 4. The top layer 4 has a top surface 12 and a bottom surface 14, as best shown in FIG. 2. While the embodiment shown has a square configuration, the invention is not limited to this shape. The top layer 4 may be rectangular, triangular or other shapes or combinations thereof which allow the cushioned protective surface to be formed. As shown in FIG. 2, the edges 10 may be angled slightly downward with respect to the plane of the top surface 12 of the top layer 4. When the square tiles 2 are positioned adjacent to each other to form a cushioned protective surface, the edges 10 will abut against each other, thereby forming channels that allow any moisture and/or liquids introduced to the top surface 12 of the top layer 4 to be quickly drained therefrom. This allows the majority of the top surface 12 to stay dry and provide the non-skid characteristics desired even in environments in which the tiles will be exposed to rain or spills, such as outdoor playgrounds, restaurants, etc. The top layer 4 is made from any material having the density and/or porosity properties that provides the desired durability and water-resistant characteristics, such as EPDM rubber, SBR rubber, other rubbers, or any combination thereof. As an example, the top layer 4 may be made from 100 percent SBR or 100 percent EPDM or any combination thereof. The density of the top layer 4 generally ranges from 980 g/L to 1350 g/L. The choice of the material used and the thickness $t_1$ of the top layer 4 depends upon the durability, resiliency and water-resistant characteristics desired.

In the embodiment shown, the top layer 4 is a pre-molded EPDM laminate plaque with a thickness $t_1$ of between approximately 2 mm to 4 mm. This combination provides the water-resistant, resiliency and durability characteristics to allow the top layer 4 to be used in fitness clubs, playgrounds and the like.

The bottom layer 8 has a generally square shape similar to that of the top layer 4 with a top surface 22 and a bottom surface 24. Similar to the top layer 4, the configuration of the bottom layer 8 is not limited to this shape. The bottom layer 4 may be rectangular, triangular or other shapes or combinations thereof which allow the cushioned protective surface to be formed. However, the configuration of the bottom layer 8 is generally consistent with the configuration of the top layer 4. The bottom layer 8 is generally configured to provide cushioning or impact absorption for the tile 2. The bottom layer 8 is made from any material having the density and/or resilient properties that provide the desired cushioning or impact absorption characteristics, such as EPDM rubber, SBR rubber, other rubbers, or any combination thereof. In general, the density of the resilient bottom layer 8 will be less than the density of the durable, water resistant top layer 4. The bottom layer is bonded together by a bonding material to maintain the respective pieces of rubber in position. The bonding material can be any suitable cured prepolymer or adhesive which maintains its properties in all environments in which the tiles 2 will be used, including an isocyanate and polyol mixture. The bonding material is generally between 6 to 14 percent by weight of the bottom layer. The thickness $t_2$ of the bottom layer 8 is dependent upon the material chosen and the cushioning or impact absorption characteristics desired.

In the embodiment shown, the bottom layer 8 is made of SBR rubber material made with shredded and cleaned tire rubber content which is bonded together using a polymer material, such as a polyurethane. In one such embodiment elongated SBR string of 6-20 mesh and granules of between 1-3 mm are used, however the invention is not so limited. While the density of the bottom layer 8 can vary greatly, for the embodiment shown, the density of the SBR material is approximately 800 gram/liter. As the bottom layer 8 is meant to provide cushioning and absorb impact, the density of the bottom layer 8 is generally less than the density of the top layer 4. Consequently, more air space is provided between the fibers of the bottom layer 8 and therefore, the cushioning or resiliency of the bottom layer 8 is enhanced. In addition, as the thickness $t_2$ of the bottom layer 8 is increased, the cushioning properties of the bottom layer 8 may also be increased. The cushioning may also be effected by the size and shape of the particles or fibers of the rubber or other material chosen. Other known variations to the shape of the bottom layer 8 may be made to increase or decrease the resiliency of the tiles 2. More resilient or cushioned applications are more appropriate in a playground settings, in which children may, while less cushioned applications are more appropriately used in high traffic areas and factory floors.

The fiber mesh layer 6 is positioned between the top layer 4 and the bottom layer 8. The fiber mesh layer 6 has a generally square shape, similar to that of the top layer 4 and bottom layer 8, with a top surface 32 and bottom surface 34. Similar to the top layer 4, the configuration of the fiber mesh layer 6 is not limited to this shape. The fiber mesh layer 6 may be rectangular, triangular or other shapes or combinations thereof which allow the cushioned protective surface to be formed. However, the configuration of the fiber mesh layer 6 is generally consistent with the configuration of the top layer 4. The fiber mesh layer 6 is generally configured to provide dimensional stability for the tile 2, as will be more fully described below. The fiber mesh layer 6 is made from any material having the dimensional stability and bonding properties that provide the desired stability and bonding characteristics, such as glass, natural fiber or other types of material or any combination thereof. The thickness $t_3$ of the fiber mesh layer 6 is dependent upon the material chosen and the difference in density between the top layer 4 and the bottom layer 8.

As will be more fully described below, an adhesive 18 is sprayed or applied to the top surface 32 of the fiber mesh layer 6. The adhesive 18 may be a polyurethane or acrylic glue or any other adhesive able to bond the fiber mesh layer 6 to the top layer 4. In various embodiments, the adhesive 18 may also be sprayed or applied to the bottom surface 34 of the fiber mesh layer 6. The adhesive used on the top surface may be the same or different than the adhesive used on the bottom surface.

Figure 3:
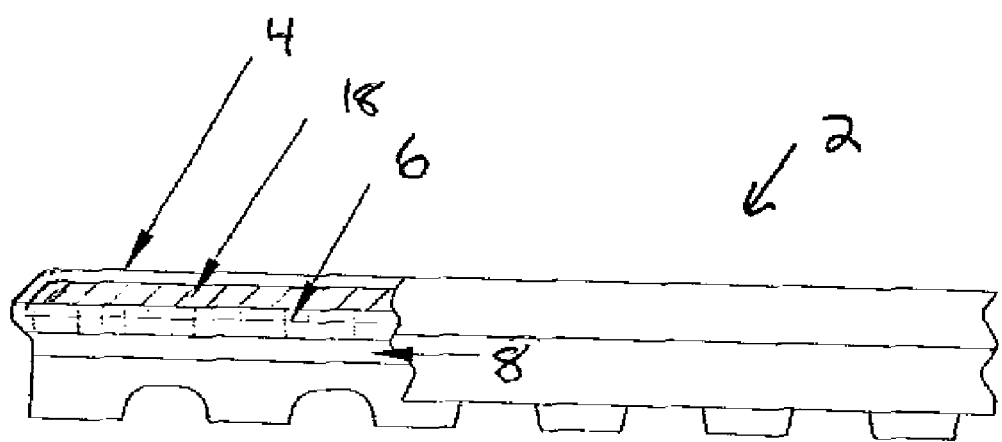
FIG. 3 is a side view of an alternate flooring tile with a portion shown in cross-section.

Referring to FIG. 3, an alternate tile is shown. In this embodiment, the thickness of the bottom layer 8 has been reduced. In addition, the length and the width of the fiber mesh layer 6 is slightly larger than the length and width of the bottom layer 8. However, in all other aspects, the embodiment of FIG. 3 is similar to that shown in FIGS. 1 and 2.

Each tile 2 may be produced using the type of mold and press that is commonly known and used in the industry. For such tiles 2, a backing mixture is poured into a mold on a press. The mixture forms the bottom layer 8 and is made of SBR rubber or other rubbers, as previously described, mixed with the type of prepolymer material described.

After the backing mixture is poured into the mold, the backing mixture is leveled. This insures that the backing mixture will be distributed uniformly in the mold and that the top surface of the backing mixture will be relatively smooth. The amount of backing mixture poured into the mold is accurately controlled to provide the resilient characteristics desired.

The fiber mesh 6 is next positioned in the mold. The fiber mesh 6 is positioned over the backing mixture provided in the mold. As the backing mixture has been leveled, a bottom surface 34 of the fiber mesh 6 is positioned on the top surface of the backing mixture, such that the bottom surface 34 and top surface are periodically in engagement along the entire length and width of the fiber mesh 6. In this position, the bottom surface 34 and top surface of the backing mixture have random air voids provided therebetween. The length and width of the fiber mesh 6 is dimensioned to be approximately equal to the length and width of an inner cavity of the mold.

The adhesive 18, as shown in FIG. 2, is applied to the top surface 32 of the fiber mesh layer 6. The adhesive 18 may be sprayed, spread or applied in any known manner to the top surface 32.

The pre-formed top layer 4 is next positioned in the mold. The top layer 4 is positioned over and covers the adhesive 18 and the fiber mesh layer 6. The bottom surface 14 of the top layer 4 is positioned on a top surface of the fiber mesh layer 6, such that the bottom surface 14 of the top layer 4 and top surface 32 of the fiber mesh layer 6 are periodically in engagement along the entire length and width of the top layer 4. In this pre-compressed condition, the bottom surface 14 and top surface 32 have random air voids provided therebetween. The length and width of the top layer 4 is dimensioned to be approximately equal but slightly larger than the length and width of the mold. The dimensions of the top layer 4 do not prevent the top layer 4 from lying flat on the top surface of the fiber mesh layer 6, even around the edges where the top layer 4 contacts the walls of the cavity.

With the backing mixture, fiber mesh 6, adhesive 18 and top layer 4 properly positioned in the mold, a ram or head of the press engages the top layer 4 and exerts a significant pressure thereon, causing the backing mixture, fiber mesh 6, adhesive 18 and top layer 4 to compress. This causes the fiber mesh layer 6 to be compressed against the backing mixture and the top layer 4 to be compressed against the fiber mesh layer 6 and the adhesive 18, thereby eliminating any unwanted pockets of air between the layers.

As the pressure is applied, the mold is maintained at an elevated temperature. The combination of the pressure and heat causes the adhesive or prepolymer of the bottom layer 8 to cure or solidify. The curing of the adhesive or prepolymer insures that the rubber and the prepolymer of the bottom layer 8 will be bonded together.

Prior to curing, the pressure also causes some of the fibers of the bottom surface 34 of the fiber mesh layer 6 to move toward the bottom layer 8 and a portion of the prepolymer of the bottom layer 8 to flow and encompass such fibers of the fiber mesh layer 6. Consequently, the solidification of the prepolymer provides a secure bond between the bottom layer 8 and the fiber mesh layer 6, as some of the fibers are captured by the prepolymer.

The application of the pressure and heat also causes the adhesive 18 to cure and bond to the top surface 32 of the fiber mesh layer 6 and the bottom surface 14 of the top layer 4. This provides a secure bond between the top layer 4 and the fiber mesh layer 6.

At the appropriate time, the ram or head of the press is retracted from the mold. With the head removed, the molded tile 2 with the bottom layer 8 bonded to the fiber mesh layer 6 and the fiber mesh layer 6 adhered to the top layer 4 is removed. This process is repeated for each tile. In the alternative each press may cooperate with more than one mold at a time, thereby allowing numerous tiles to be made simultaneously.

Alternatively, each tile 2 may be produced by manufacturing each layer 4, 6, 8 separately and then joining the layers using adhesive 18. In so doing, the fiber mesh layer 6 has the adhesive 18 applied to its top surface 32 and bottom surface. The fiber mesh 6 is then positioned on the bottom layer 8. The top layer 4 is then brought into position on the fiber mesh layer 6. Pressure may then be applied to the top layer 4, exerting a significant pressure thereon; causing the top layer 4, fiber mesh 6, adhesive 18 and bottom layer 8 to compress, thereby eliminating any unwanted pockets of air between the layers. The pressure causes the adhesive 18 to cure and adhere the top surface 32 of the fiber mesh layer 6 to the bottom surface 14 of the top layer 4 and the bottom surface 34 of the fiber mesh layer 6 to the top surface 22 of the bottom layer 8. This provides a secure bond between the top layer 4, the fiber mesh layer 6, and the bottom layer 8.

While in the above example, the adhesive is applied to the fiber mesh layer 6, the adhesive could also be applied to the appropriate surfaces of the top layer 4 and bottom layer 8, or any combination thereof.

The utilization of a prefabricated top layer allows the thickness of the top layer to be more uniform and controlled. As the prefabricated top layer is cut from pre-molded material, the thickness can be controlled. In the prior art, the top layer may have areas in which the thickness of the material was "thin" due to the vagaries of pouring. This could lead to uneven wear of the tiles. Other advantages of a preformed top layer are known, including, but not limited to, the ability to enhance the aesthetics.

The durability of the tiles of the present invention is also enhanced. As the density of the prefabricated top layer is greater than previously obtainable, the top layer will be less porous. As less liquid will be able to penetrate the tile, the durability of the tile over time will be enhanced. This also allows the tile to be used in environments not previously considered acceptable (i.e. restaurants).

As the density of the top layer 4 increases, the difference in density between the top layer 4 and the bottom layer 8 can cause dimensional instability of the tile 2. However, the use of the fiber mesh layer 6 reduces the dimensional instability of the tile 2 due to the density difference between the top layer 4 and the bottom layer 8.

In order to minimize the internal stresses of the tile 2, the fiber mesh layer 6 may have a dimensional coefficient which is between the dimensional coefficient of the top layer and the dimensional coefficient of the bottom layer. This allows the dimensional changes of the layers to occur in a manner that does not result in the failure of any of the layers or the bonds therebetween.

Dimensional stability is the degree to which a material maintains its original dimensions when subjected to changes in temperature and humidity. Dimensional instability can be caused by the linear expansion/contraction and thickness swelling/shrinkage of the various layers of the tiles 2 when exposed to changing temperatures and humidity conditions.

In prior art panels, in which the top layer is adhered or bonded to the bottom layer, the interface between the top layer and the bottom layer is subject to significant stresses as the top layer and bottom layer expand and contract at different rates when exposed to changes in temperature and humidity conditions. These high internal stresses can cause the tiles to buckle, curl, gap or have the top layer physically separate from the bottom layer. Gapping may result in debris filling the gaps between the stressed tiles which causes maintenance and health issues. Lifting edges and separation of the top layer from the bottom layer can cause tripping and other safety concerns. However, as the top layer and bottom layer must be made from different compositions having different densities in order to obtain the characteristics desired, the large internal stresses are inherent in the prior art tiles.

In the panels of the present invention, in which the top layer 2 is adhered to the fiber mesh layer 6 and the bottom layer is bonded to or adhered to the fiber mesh layer 6, the fiber mesh layer 6 acts as a buffer between the top layer 4 and the bottom layer 8. As the fiber mesh layer 6 is included as a buffer between the top layer 4 and bottom layer 8, the fiber mesh layer 6 can be made of material to optimize the dimensional stability in both the linear and thickness direction. In addition, the composition of the fiber mat layer 6 is interwoven to allow the relative movement of the fibers with respect to each other. This allows the top surface 32 of the fiber mesh layer 6 to move relative to the bottom surface 34.

As the tile 2 is subject to temperature and moisture variations, the top layer 4 and bottom layer 8 expand and contract at different rates. However, the fiber mesh layer 6 remains relatively stable when exposed to changes in temperature and humidity conditions. Consequently, as the top layer 4 changes dimensionally, whether by expansion, contraction, swelling, shrinkage or other, the top surface 32 of the fiber mesh layer 6 which is adhered to the top layer 4 can move to accommodate the changes dimensionally of the top layer 4 without the introduction of high internal stresses. This allows the top layer 4 to remain adhered to the fiber mesh layer 6, thereby maintaining the integrity therebetween. Similarly, as the bottom layer 8 changes dimensionally, the bottom surface 34 of the fiber mesh layer 6 which is adhered or bonded to the bottom layer 8 can move to accommodate the changes dimensionally of the bottom layer 8 without the introduction of high internal stresses. This allows the bottom layer 8 to remain adhered or bonded to the fiber mesh layer 6, thereby maintaining the integrity therebetween.

The use of the fiber mesh layer 6 allows the dimensional changes of the top layer 4 to be isolated and substantially independent from the dimensional changes of the bottom layer 8. As the fiber mesh layer 6 acts as a buffer or intermediate layer, the high internal stresses present in the prior art tiles are essentially eliminated, thereby preventing the tiles from buckling, curling, gaping or having the top layer physically separate from the bottom layer. Consequently, maintenance, health and safety concerns are reduced.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims together with their full equivalents.

The invention claimed is:

1. A protective floor tile comprising:
a pre-formed first layer made from material having a first density, the first layer having first dimensional movement with respect to changing environmental conditions;
a second layer made from material having a second density, the second density being less than the first density, the second layer having second dimensional movement with respect to the changing environmental conditions;
a mesh layer positioned between the first layer and the second layer;
an adhesive applied between the first layer and the mesh layer to bond the first layer to the mesh layer;
second surface of the mesh layer being adhered to the second layer;
the mesh layer having dimensional stability with respect to the changing environmental conditions;
whereby the mesh layer allows the first dimensional movement of the first layer to be isolated from the second dimensional movement of the second layer.

2. The floor tile as recited in claim 1, wherein an adhesive is applied between the second layer and the mesh layer, the adhesive cooperating with the second layer to adhere the mesh layer to the second layer.

3. The floor tile as recited in claim 1, wherein the adhesive is a polyurethane or acrylic glue.

4. The floor tile as recited in claim 1, wherein a prepolymer of the second layer interacts with fibers of second surface of the mesh layer to adhere the mesh layer to the second layer.

5. The floor tile as recited in claim 1, wherein the first layer is a top layer which is made from any material having a density of between approximately 982 g/L to approximately 1350 g/L.

6. The floor tile as recited in claim 5, wherein the second layer is a bottom layer which is made from any material having a density less than the density of the first layer.

7. A protective floor tile comprising:
a pre-formed durable and water resistant first layer made from material having a thickness of between approximately 2 mm to approximately 4 mm and a first density, the first layer having first dimensional movement with respect to temperature and moisture variations;

a resilient second layer made from material having a second density, the second density being less than the first density, the second layer having second dimensional movement with respect to the temperature and moisture variations, the second dimensional movement being different than the first dimensional movement;

a fiber mesh layer positioned between the first layer and the second layer;

an adhesive applied between the first layer and the fiber mesh layer to bond the first layer to the fiber mesh layer;

a second surface of the fiber mesh layer being adhered to the second layer;

the fiber mesh layer having dimensional stability with respect to the temperature and moisture variations;

whereby the fiber mesh layer allows the first dimensional movement of the first layer to be substantially independent of the second dimensional movement of the second layer to occur resulting in minimal internal stress in the protective flooring tile.

8. The floor tile as recited in claim 7, wherein an adhesive is applied between the second layer and the fiber mesh layer, the adhesive cooperating with the second layer to adhere the fiber mesh layer to the second layer.

9. The floor tile as recited in claim 8, wherein the adhesive is a polyurethane or acrylic glue.

10. The floor tile as recited in claim 7, wherein the fiber mesh layer is made from any material having the dimensional stability and bonding properties that provide the desired stability characteristics.

11. The floor tile as recited in claim 10 wherein the thickness of the fiber mesh layer is dependent upon the fiber material and the difference in density between the first layer and the second layer.

12. The floor tile as recited in claim 11, wherein the length and width of the first layer are dimensioned to be slightly larger than the length and width of the fiber mesh layer.

* * * * *